United States Patent
Cho et al.

(10) Patent No.: US 9,451,437 B2
(45) Date of Patent: Sep. 20, 2016

(54) SYSTEM, APPARATUS, METHOD, AND COMPUTER-READABLE RECORDING MEDIUM FOR CHANGING USER TERMINAL SETTINGS

(71) Applicant: Samsung Electronics Co., Ltd., Gyeonggi-do (KR)

(72) Inventors: In-Sung Cho, Gyeonggi-do (KR); Dong-Sung Kim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 12 days.

(21) Appl. No.: 14/264,747

(22) Filed: Apr. 29, 2014

(65) Prior Publication Data

US 2014/0323113 A1 Oct. 30, 2014

(30) Foreign Application Priority Data

Apr. 29, 2013 (KR) ........................ 10-2013-0047494

(51) Int. Cl.
| | |
|---|---|
| H04M 3/00 | (2006.01) |
| H04W 8/00 | (2009.01) |
| H04L 29/08 | (2006.01) |
| H04W 4/02 | (2009.01) |
| H04W 8/24 | (2009.01) |
| H04M 1/725 | (2006.01) |

(52) U.S. Cl.
CPC ............ *H04W 8/005* (2013.01); *H04L 67/125* (2013.01); *H04L 67/26* (2013.01); *H04L 67/34* (2013.01); *H04W 4/02* (2013.01); *H04M 1/72525* (2013.01); *H04M 3/00* (2013.01); *H04W 8/245* (2013.01)

(58) Field of Classification Search
CPC ..... H04W 8/005; H04W 4/02; H04W 8/245; H04L 67/125; H04L 67/26; H04L 67/34; H04M 3/00

USPC ................ 455/418, 569.2, 575.9, 414.1, 419
See application file for complete search history.

(56) References Cited

U.S. PATENT DOCUMENTS

| | | | |
|---|---|---|---|
| 6,593,848 B1 * | 7/2003 | Atkins, III ................. 340/426.1 |
| 6,980,837 B2 * | 12/2005 | Chung ........................ 455/569.2 |
| 8,676,273 B1 * | 3/2014 | Fujisaki ........................ 455/567 |
| 2005/0032502 A1 * | 2/2005 | Tokudome .................... 455/403 |
| 2007/0082614 A1 * | 4/2007 | Mock .................... H04W 88/02 455/41.2 |
| 2009/0215466 A1 * | 8/2009 | Ahl ........................ H04M 1/66 455/456.1 |
| 2009/0253454 A1 * | 10/2009 | Sampson ................... 455/550.1 |
| 2009/0275321 A1 * | 11/2009 | Crowe ..................... H04L 51/12 455/418 |
| 2011/0105097 A1 * | 5/2011 | Tadayon et al. .............. 455/418 |
| 2012/0035932 A1 * | 2/2012 | Jitkoff et al. ................. 704/254 |
| 2012/0071140 A1 * | 3/2012 | Oesterling et al. ........ 455/414.1 |
| 2014/0179348 A1 * | 6/2014 | Simon ........................ 455/456.1 |

* cited by examiner

Primary Examiner — Mong-Thuy Tran
(74) Attorney, Agent, or Firm — The Farrell Law Firm, P.C.

(57) ABSTRACT

A vehicle communication methods and device for changing a user terminal setting by using a push message is provided. The vehicle communication device includes a storage unit configured to map at least one vehicle mode information to terminal identification information of the user terminal, to which a message is transmitted, and each vehicle information, including vehicle state information or operation information, and store the mapped information; a vehicle information collector configured to collect vehicle information; a message generator configured to generate a transmission message including at least one vehicle mode information mapped to the collected vehicle information and the stored terminal identification information; and a message transmitter configured to transmit the generated transmission message to the user terminal through a push message server.

14 Claims, 10 Drawing Sheets

800a

| 810 | 820 | 830a | |
|---|---|---|---|
| HEADER AREA | TERMINAL IDENTIFICATION INFORMATION AREA | MODE INFORMATION AREA | ... |

| 810 | 820 | 830b | |
|---|---|---|---|
| HEADER AREA | TERMINAL IDENTIFICATION INFORMATION AREA | TERMINAL SETTING INFORMATION AREA | ... |

FIG.8B

SYSTEM, APPARATUS, METHOD, AND COMPUTER-READABLE RECORDING MEDIUM FOR CHANGING USER TERMINAL SETTINGS

PRIORITY

This application claims priority under 35 U.S.C. §119(a) to Korean Application Serial No. 10-2013-0047494, which was filed in the Korean Intellectual Property Office on Apr. 29, 2013, the entire content of which is incorporated herein by reference.

BACKGROUND OF THE INVENTION

1. Field of the Invention

The present invention relates generally to a system for changing a user terminal setting, and more particularly, to a system, an apparatus, a method, and a computer-readable recording medium for changing a user terminal setting by using a push message.

2. Description of the Related Art

The wide spread utilization of the Internet has brought about the rapid development of wireless mobile communication technologies beyond that of wired communication technologies. In everyday life, searching for information on the Internet through portable terminals such as a smart phone, a Personal Digital Assistant (PDA), a hand-held computer and the like has become possible without regard to time and place.

Various types of application programs which can provide various functions through Internet access are installed in different types of wired/wireless terminals which can access the Internet.

Meanwhile, users of terminals such as smart phones, tablet PCs and the like generally instruct the terminal to search for and connect with peripheral devices such as, for example, a Bluetooth headset, a Bluetooth earphone and the like. However, such a setting instructions cause the terminal to periodically search for the peripheral devices even in a state where there is no peripheral device to be connected in a surrounding area of the terminal. Accordingly, due to such an unnecessary operation, battery consumption increases and thus duration of use of the terminal is reduced.

Further, when a driver receives a text message through a smart phone while driving, the driver can identify contents of the received text message, even while driving, through a voice if a Text to Speech (TTS) function is activated in the driver's smart phone. However, such a function is normally used only while driving, so that the user is required to change a setting in a setting menu of the user terminal before driving in order to use the function while driving, and should return the setting to an original state when not driving.

That is, as described above, since the driver changes various setting information of the terminal whenever the driver gets into/out of a vehicle or according to various scenarios while driving, the user is inconvenienced in the use of the terminal.

SUMMARY OF THE INVENTION

The present invention has been made to address at least the problems and disadvantages described above, and to provide at least the advantages described below.

Accordingly, aspects of the present invention provide a system, an apparatus, a method, and a computer-readable recording medium for changing a user terminal setting by using a push message, which can automatically change a setting of the user terminal in accordance with a vehicle state or operation by mapping mode information to vehicle information, such as each state or operation of the vehicle in a vehicle communication device and storing the mapped information, and transmitting mode information, corresponding to currently collected vehicle information, to a preset user terminal through a push message.

An aspect of the present invention provides a system, an apparatus, a method, and a computer-readable recording medium for changing a user terminal setting by using a push message, which can automatically change a setting of the user terminal in accordance with a vehicle state or operation by mapping user terminal setting information to vehicle information, such as each state or operation of the vehicle in a vehicle communication device and storing the mapped information, and transmitting user terminal setting information, corresponding to currently collected vehicle information, to a preset user terminal.

In accordance with an aspect of the present invention, a vehicle communication device is provided. The vehicle communication device includes a storage unit configured to map at least one vehicle mode information to terminal identification information of a user terminal, to which a message will be transmitted, and each vehicle mode information, including vehicle state information or operation information, and store the mapped information; a vehicle information collector configured to collect vehicle information; a message generator configured to generate a transmission message including at least one vehicle mode information mapped to the collected vehicle information and the stored terminal identification information; and a message transmitter configured to transmit the generated transmission message to the user terminal.

In accordance with another aspect of the present invention, a vehicle communication device is provided. The vehicle communication device includes a storage unit configured to map at least one terminal setting information, related to a setting of a user terminal, to terminal identification information of the user terminal, to which a message is transmitted, and each vehicle information, including vehicle state information or operation information, and store the mapped information; a vehicle information collector configured to collect vehicle information; a message generator configured to generate a transmission message, including at least one terminal setting information mapped to the collected vehicle information and the stored terminal identification information; and a message transmitter configured to transmit the generated transmission message to the user terminal.

In accordance with another aspect of the present invention, a system for changing a user terminal setting by using a push message is provided. The system includes a vehicle communication device configured to map at least one vehicle mode information to terminal identification information of a user terminal, to which a message is transmitted, and each vehicle information, including vehicle state information or operation information, and store the mapped information, and transmit a generated transmission message including at least one vehicle mode information mapped to collected vehicle information and the stored terminal identification information; a push message server configured to receive the transmission message from the vehicle communication device, generate a push message through the vehicle mode information included in the transmission message, and transmit the generated push message to the user terminal corresponding to the terminal identification information; and the user terminal configured to receive the push message from the push message server and change a setting according to the terminal setting information mapped to the vehicle mode information included in the push message.

In accordance with another aspect of the present invention, a system for changing a user terminal setting by using a push message is provided. The system includes a vehicle communication device configured to map at least one terminal setting information related to a setting of a user terminal, to terminal identification information of the user terminal to which a message is transmitted, and each vehicle information, including vehicle state information or operation information, and store the mapped information, and transmit a generated transmission message, including at least one vehicle mode information mapped to collected vehicle information and the stored terminal identification information; a push message server configured to receive the transmission message from the vehicle communication device, generate a push message through the vehicle mode information included in the transmission message, and transmit the generated push message to the user terminal corresponding to the terminal identification information; and the user terminal configured to receive the push message from the push message server and change a setting according to the terminal setting information included in the push message.

In accordance with another aspect of the present invention, a method of changing a user terminal setting by using a push message is provided. The method includes mapping at least one vehicle mode information to terminal identification information of a user terminal, to which a message is transmitted, and each vehicle information, including vehicle state information or operation information, and storing the mapped information; collecting vehicle information according to a change in a vehicle state or operation; generating a transmission message including at least one vehicle mode information mapped to the collected vehicle information and the stored terminal identification information; and transmitting the generated transmission message to the user terminal through a push message server.

In accordance with another aspect of the present invention, a method of changing a user terminal setting by using a push message is provided. The method includes mapping at least one terminal setting information, related to a setting of a user terminal, to terminal identification information of the user terminal, to which a message is transmitted, and each vehicle information, including vehicle state information or operation information, and storing the mapped information; collecting vehicle information according to a change in a vehicle state or operation; generating a transmission message including at least one terminal setting information mapped to the collected vehicle information and the stored terminal identification information; and transmitting the generated transmission message to the user terminal through a push message server.

BRIEF DESCRIPTION OF THE DRAWINGS

The above and other aspects, features, and advantages of the present invention will be more apparent from the following detailed description taken in conjunction with the accompanying drawings, in which:

FIG. 8A illustrates a structure of a message transmitted in a vehicle communication device according to an embodiment of the present invention; and FIG. 8B illustrates a structure of a message transmitted in a vehicle communication device according to an embodiment of the present invention.

DETAILED DESCRIPTION OF EMBODIMENTS OF THE PRESENT INVENTION

Figure 1:
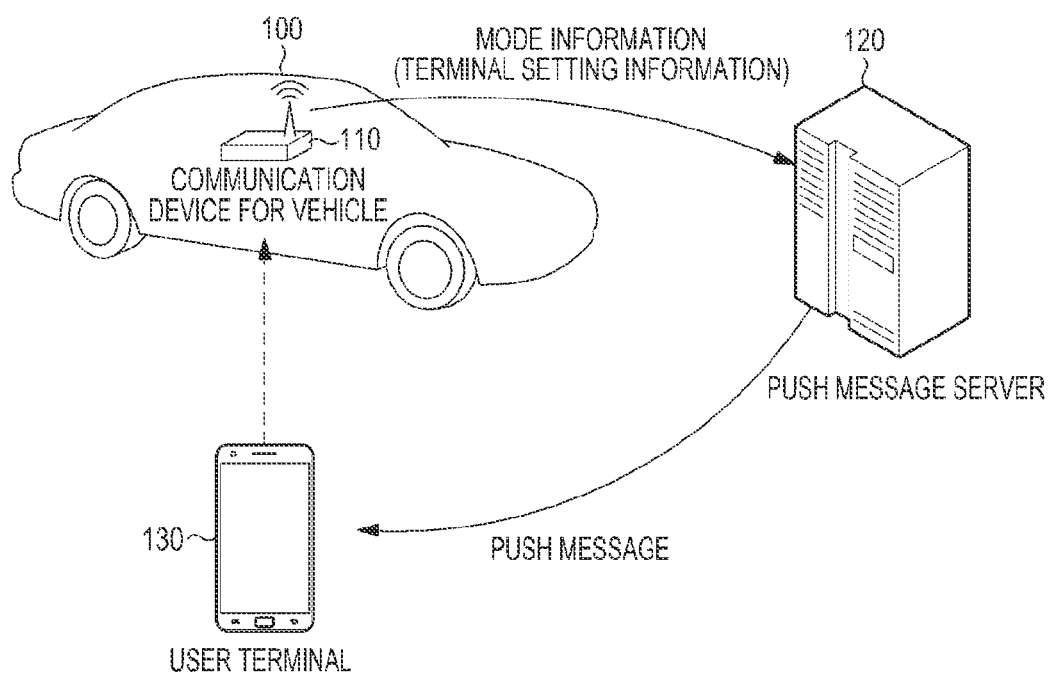
FIG. 1 illustrates a method for changing a user terminal setting by using a push message according to an embodiment of the present invention.

The detailed description of the present invention will be described below with reference to the accompanying drawings illustrated for embodiments implementing the present disclosure. The embodiments are described in detail to the extent that those skilled in the art may implement the present disclosure. The various embodiments of the present invention should be understood to not be mutually exclusive. For example, a specific shape, structure, and properties listed in other embodiments may be implemented with respect to an embodiment of the present invention without departing from the spirit and scope of the present invention. It should be understood that the location or placement of individual components may be changed within each of the disclosed embodiments of the present invention without departing from the spirit and scope of the present invention. Therefore, the following detailed description should not be taken in a limiting sense, and the scope of the present invention should be limited only by the appended claims, along with the full range of equivalents to the claims. Similar reference numerals refer to elements having the same or similar functions and drawings may be expressed with exaggerated thicknesses, lengths and area for the convenience of description.

While terms including ordinal numbers, such as "first" and "second," etc., may be used to describe various components, such components are not limited by the above terms. The above terms are used only to distinguish one component from another. For example, a first component may be referred to as a second component without departing from the scope of the present invention, and likewise a second component may be referred to as a first component. The term "and/or" encompasses a combination of plural items or any one of the plural items.

The terms used herein are merely used to describe specific embodiments, and are not intended to limit the present invention. An expression used in the singular encompasses the expression of the plural, unless it has a clearly different meaning in the context. Terms such as "include" and/or "have" may be construed to denote a certain characteristic, number, step, operation, constituent element, component or a combination thereof, but may not be construed to exclude the existence of or a possibility of an addition of one or more other characteristics, numbers, steps, operations, constituent elements, components or combinations thereof.

Unless defined otherwise, all terms used herein have the same meaning as commonly understood by those of skill in the art. Such terms, as those defined in a generally used dictionary, are to be interpreted to have the same meanings as the contextual meanings in the relevant field of art, and are not to be interpreted to have ideal or excessively formal meanings unless clearly defined in the present disclosure.

An embodiment of the present invention provides a system, an apparatus, and a method for changing a user terminal setting by using a push message which can automatically change various setting information of the user terminal through the push message when the user terminal is located in a specific space.

For example, when a driver is inside of a vehicle, the user terminal collects various state information or operation information of the vehicle through a separate vehicle communication device mounted within the vehicle and automatically changes various settings of the user terminal in accordance with the corresponding vehicle state or operation. Accordingly, an embodiment of the present invention transmits a push message to the user terminal to change the user terminal setting.

According to an embodiment of the present invention, mode information corresponding to a state or operation of the vehicle is mapped and stored in the vehicle communication device in advance. When currently collected state or operation information of the vehicle corresponds to a prestored particular mode, corresponding mode information may be transmitted to the user terminal. The user terminal may automatically change at least one setting information according to the received mode information.

Furthermore, according to an embodiment of the present invention, setting information of the user terminal corresponding to a state or operation of the vehicle is mapped and stored in the vehicle communication device in advance, and corresponding terminal setting information may be transmitted to the user terminal according to the currently collected state or operation of the vehicle. The user terminal may receive the terminal setting information and automatically change corresponding setting information.

According to an embodiment of the present invention, the vehicle communication device directly generates a push message, and then either directly transmits the push message to the user terminal or transmits the generated push message to the user terminal through a push message server. According to another embodiment, the vehicle communication device transmits a transmission message including mode information or terminal setting information to a push message server. The push message server may generate a push message including the mode information or the terminal setting information and transmit the generated push message to the user terminal.

The user terminal in the following embodiments of the present invention may include any electronic device such as, for example, a touch screen device, including a portable terminal, a mobile terminal, a communication terminal, a portable communication terminal, a portable mobile terminal or the like. For example, the user terminal may be a smart phone, a mobile phone, a gaming device, a Television (TV), a display device, a head unit for a vehicle, a notebook computer, a laptop computer, a tablet computer, a Personal Media Player (PMP), a Personal Digital Assistant (PDA), a navigation device, an Automated Teller Machine (ATM) of a bank, a Point Of Service (POS) device of a shop and the like. Further, the user terminal according to the present invention may be a flexible device or a flexible display device.

FIG. 1 illustrates a method for changing a user terminal setting by using a push message according to an embodiment of the present invention. Referring to FIG. 1, according to an embodiment of the present invention, a vehicle communication device 110 is mounted within a vehicle 100 and various state information or operation information of the vehicle 100 may be collected by the vehicle communication device 110. Further, the vehicle communication device 110 includes a wired/wireless communication means configured to transmit information to a user terminal 130 through a push message server 120.

According to an embodiment of the present invention, the vehicle communication device 110 may pre-store mode information or terminal setting information corresponding to the state information or operation information of the vehicle 100. Accordingly, when the state information or operation information of the vehicle 100 is collected, the vehicle communication device 110 may transmit mode information or terminal setting information, corresponding to the collected state information or operation information, to the corresponding the user terminal 130 through the push message server 120. For the transmission, the vehicle communication device 110 may also store identification information of the user terminal 130 (that is, terminal identification information) to which the information will be transmitted.

Accordingly, the vehicle communication device 110 transmits terminal identification information of the user terminal 130 to the push message server 120 together with the mode information or the terminal setting information. Then, the push message server 120 may generate a push message, including the mode information or the terminal setting information transmitted from the vehicle communication device 110, and transmit the generated push message to the user terminal 130 corresponding to the terminal identification information.

For example, when the user gets in the vehicle 100 with the user terminal 130 and drives the vehicle 100, the user can automatically change various settings of the user terminal 130 according to a current vehicle state or vehicle operation.

Hereinafter, a system, an apparatus, and a method according to an embodiment of the present invention will be described with reference to FIGS. 2 through 6.

Figure 2:
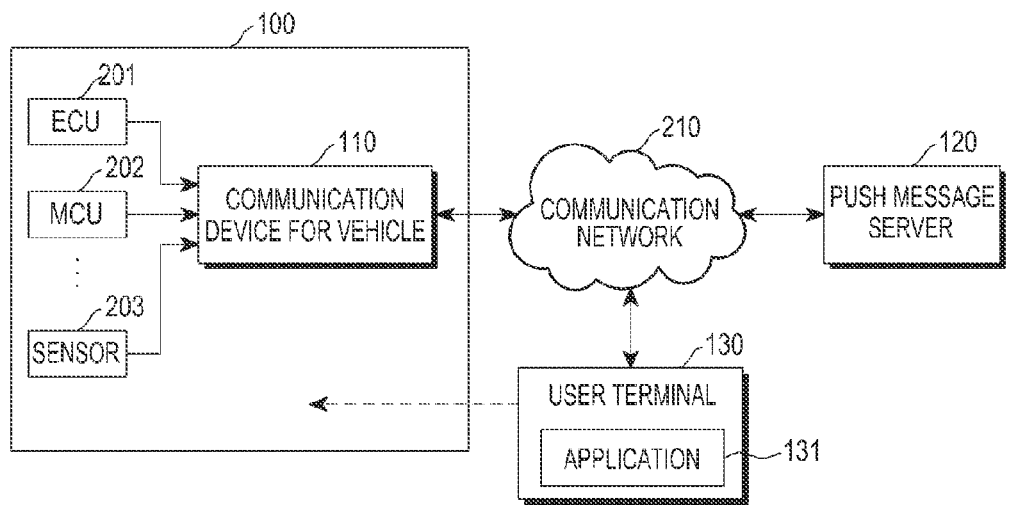
FIG. 2 is illustrates a user terminal setting changing system using a push message according to an embodiment of the present invention.

FIG. 2 illustrates a user terminal setting changing system using a push message according to an embodiment of the present invention. Referring to FIG. 2, the system according to the embodiment of the present invention may include the vehicle communication device 110, a communication network 210, the push message server 120, and the user terminal 130.

The vehicle communication device 110 included in the vehicle 100 can receive state information or operation information of the vehicle 100 from an Electronic Control Unit (ECU) 201, a Micro Controller Unit (MCU) 202, and various sensors 203. Meanwhile, although FIG. 2 illustrates an example in which the state information or operation information of the vehicle is received through the vehicle communication device 110, the state information or operation information of the vehicle may be received through another means. For example, when the user starts the vehicle, the user can directly receive ignition information from an ignition key. That is, according to embodiments of the present invention, the state information or operation information of the vehicle can be received through any method and means, and the present invention is not limited to a particular means.

The state information of the vehicle received by the vehicle communication device 110 may include information related to operation of the vehicle such as whether the vehicle is started, speed information, acceleration information, deceleration information and the like, or information related to a device attached to the vehicle such as, for example, power information or volume information of a car audio device. Further, the operation information of the vehicle may include various types of operation information such as, for example, an operation of starting the vehicle, an operation of stepping on an acceleration pedal, and an operation of stepping on a brake pedal.

As described above, at least one mode information (for example, running mode information) corresponding to the state information or operation information of the vehicle 100 or terminal setting information of the user terminal 130 may be stored in the vehicle communication device 110. Accordingly, when the vehicle communication device 110 receives the state or operation information of the vehicle 100, the vehicle communication device 110 transmits mode information or terminal setting information corresponding to the received state information or operation information of the vehicle 100 to the user terminal 130 through the communication network 210.

As described above, the mode information or the terminal setting information may be transmitted to the user terminal 130 through the push message server 120 in the form of the push message. Meanwhile, according to an embodiment of the present invention, the vehicle communication device 110 may transmit a message including the mode information or the terminal setting information to the push message server 120 through the communication network 210 and the push message server 120 may generate a push message including the received mode information or terminal setting information and transmit the generated push message to the user terminal 130. According to another embodiment of the present invention, the vehicle communication device 110 may instead directly generate the push message including the mode information or the terminal setting information and then directly transmit the generated push message to the user terminal 130 or transmit the generated push message to the user terminal 130 through the push message server 120.

Meanwhile, as described above, the vehicle communication device 110 can store the terminal identification information of the user terminal 130 and transmit the mode information or the terminal setting information to the push message server 120 together with the stored terminal identification information. Accordingly, the push message server 120 generates the push message from the mode information or the terminal setting information and transmits the generated push message to the user terminal 130 corresponding to the terminal identification information. Further, according to an embodiment of the present invention, the user terminal 130 can receive the push message from the push message server 120 by registering its own terminal identification information with the push message server 120 in advance.

As described above, the user terminal 130, having received the push message from the push message server 120, identifies the mode information or the terminal setting information included in the push message and automatically changes corresponding setting information of the user terminal 130. An application 131, which processes the received push message, may be installed in the user terminal 130. Accordingly, the application 131 identifies the push message received from the push message server 120 and changes the setting information of the user terminal 130 according to the mode information or the terminal setting information included in the push message. According to an embodiment of the present invention, when the application 131 is installed in the user terminal 130 and initially executed, the terminal identification information of the user terminal 130 may be registered with the push message server 120.

There are various methods which change the setting information of the user terminal 130 using the application 131. For example, according to an embodiment of the present invention, when the mode information is included in the push message, at least one setting information corresponding to each mode information is identified and a corresponding setting of the user terminal 130 may be changed. Further, according to another embodiment of the present invention, when the terminal setting information is included in the push message, a setting of the user terminal 130 may be immediately changed in accordance with the terminal setting information.

Figure 7A:
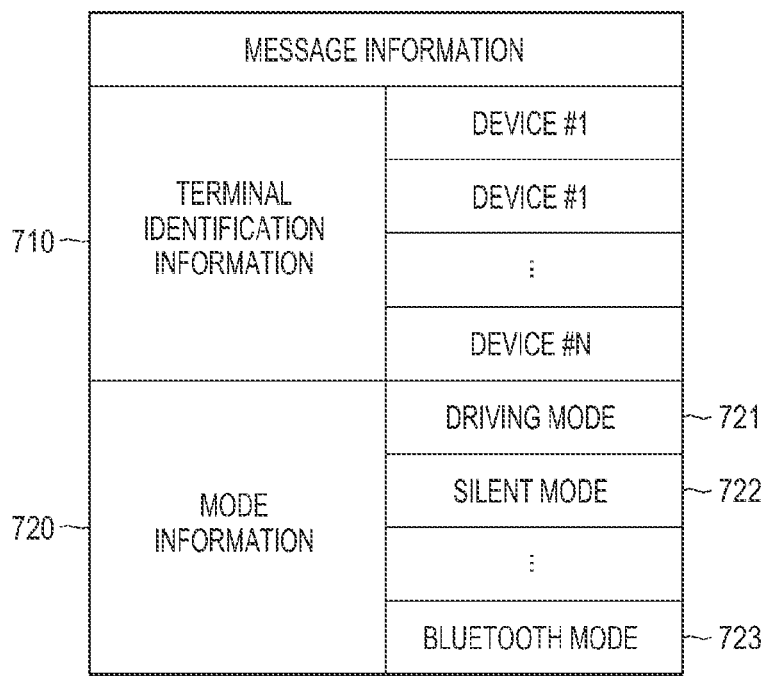
FIG. 7A illustrates a structure of information stored in a vehicle communication device according to an embodiment of the present invention.

The mode information may include modes related to operations of the vehicle as shown in FIG. 7A. For example, a driving mode, a silent mode, a Bluetooth mode and the like may be set according to a current vehicle state or operation. At least one terminal setting information according to each mode may be mapped and stored in the user terminal 130. Accordingly, when the mode information is included in the push message, at least one setting corresponding to a current mode may be changed through an identification of the pre-stored mapping information. For example, the setting may be made in the driving mode such that a message reception notification is changed from a vibration to a sound and a TTS function is activated when a message is received. Further, in the Bluetooth mode, a function of activating a Bluetooth function of the user terminal 130 is mapped and thus neighboring Bluetooth devices are searched for.

The communication network 210 may be implemented regardless of the means of communication such as wired/wireless communication, and may be implemented by various communication networks including a Personal Area Network (PAN), a Local Area Network (LAN), a Metropolitan Area Network (MAN), a Wide Area Network (WAN) and the like. Further, the communication network 210 may be a known World Wide Web (WWW), and may use a wireless transmission technology utilized for the PAN such as Infrared Data Association (IrDA) or Bluetooth.

Figure 3:
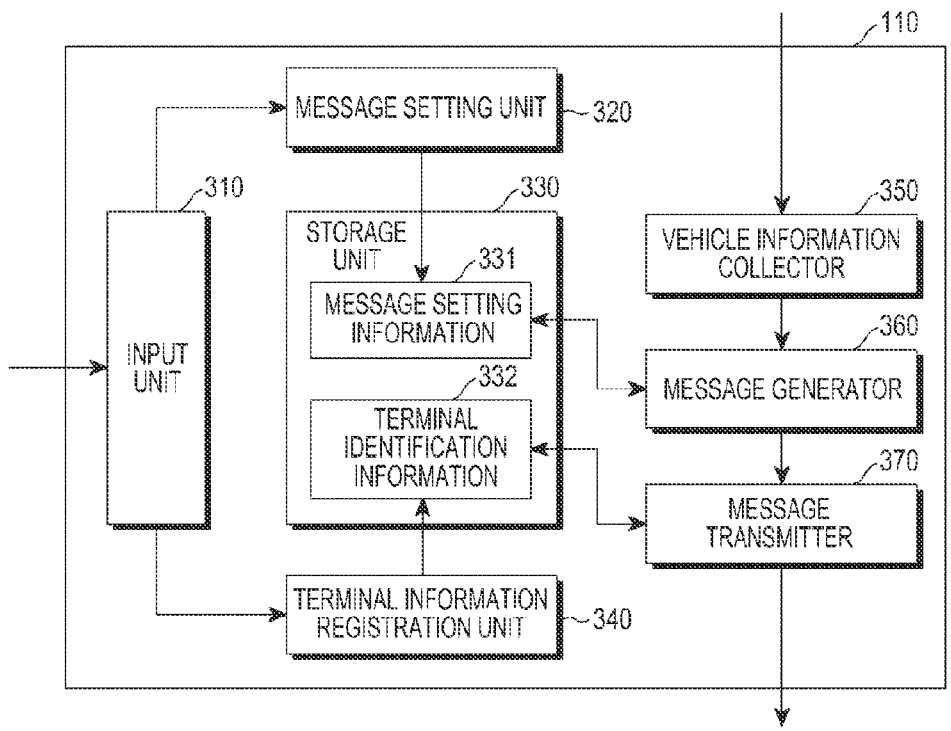
FIG. 3 is a block diagram illustrating a detailed structure of a vehicle communication device according to an embodiment of the present invention.

FIG. 3 illustrates a detailed structure of the vehicle communication device 110 according to an embodiment of the present invention. Referring to FIG. 3, the vehicle communication device 110 may include an input unit 310, a message setting unit 320, a storage unit 330, a terminal information registration unit 340, a vehicle information collector 350, a message generator 360, and a message transmitter 370.

The message setting unit 320 stores message setting information 331, which is input through the input unit 310, in the storage unit 330. The terminal information registration unit 340 stores terminal identification information 332, which is input through the input unit 310, in the storage unit 330.

Figure 7B:
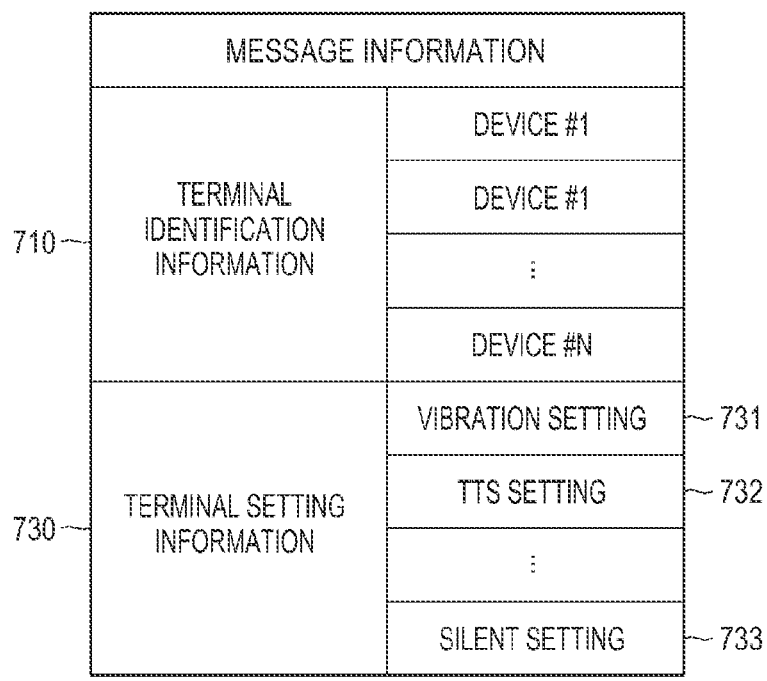
FIG. 7B is a diagram illustrating a structure of information stored in a vehicle communication device according to an embodiment of the present invention.

The message setting information 331 may include mode information or terminal setting information, as shown in FIGS. 7A and 7B. That is, the message setting information 331 may include terminal setting information for directly changing setting information of the user terminal 130, which is setting information of the message to be transmitted to the user terminal 130, or mode information mapped to at least one terminal setting information.

The terminal identification information 332 corresponds to information through which the user terminal 130 can be identified, and may include a phone number of the user terminal 130, a device serial number, an Electronic Serial Number (ESN), Medium Access Control (MAC) address information and the like. However, the present invention is not limited thereto.

Accordingly, the user may register the user terminal 130, which will receive the push message through the input unit 310 included in the vehicle communication device 110, with the vehicle communication device 110, and set or input setting information of the user terminal 130 to be set according to each operation mode.

The storage unit 330 stores various information for generating and transmitting a message according to an embodiment of the present invention. For example, the storage unit 330 can store mode information, corresponding to state information or operation information of each vehicle, or terminal setting information of the user terminal 130 as the message setting information 331. Further, the storage unit 330 can store identification information of the user terminal 130, to which the message will be transmitted, as the terminal identification information 332.

The vehicle information collector 350 collects current vehicle state information and/or operation information from each device within the vehicle and/or the sensor as described in FIG. 2.

The message generator 360 reads mode information or terminal setting information, corresponding to the vehicle state information or operation information collected by the vehicle information collector 350, from the storage unit 330 and generates a message to be transmitted. At this time, the message generator 360 may generate the message in a form of the push message or in a different type of message other than the push message. The message to be transmitted may further include terminal identification information of the user terminal 130 to which the message will be transmitted.

The message transmitter 370 transmits the generated message to the push message server 120 or the user terminal 130.

Figure 4:
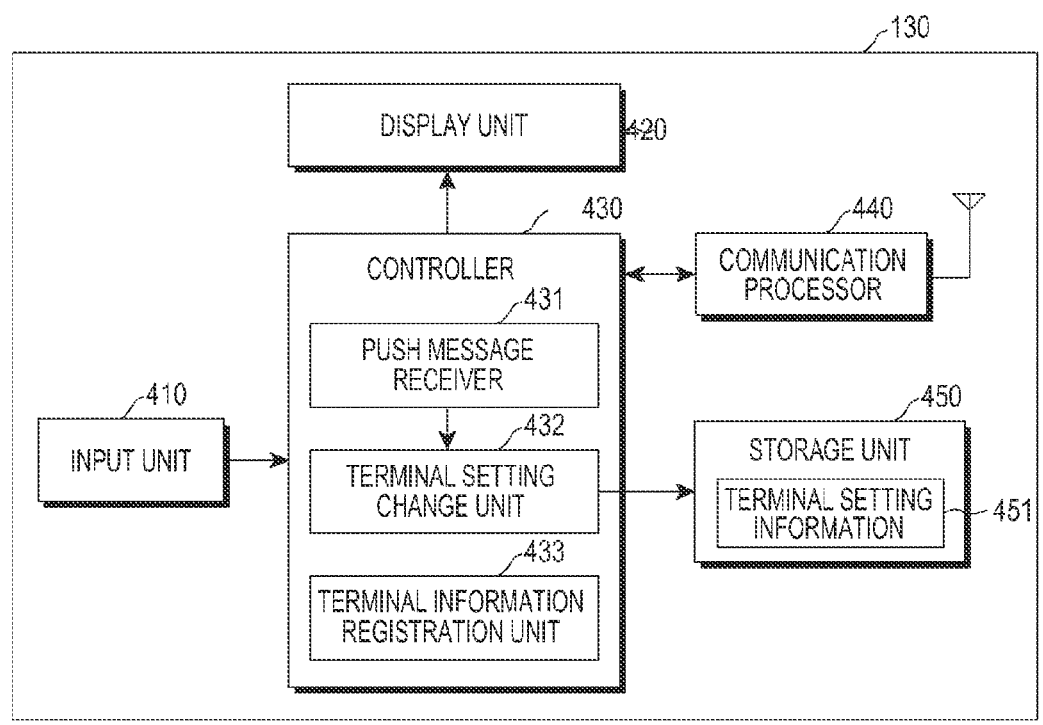
FIG. 4 is a block diagram illustrating a detailed structure of a user terminal according to an embodiment of the present invention.

FIG. 4 illustrates a detailed structure of the user terminal 130 according to an embodiment of the present invention. Referring to FIG. 4, the user terminal 130 may include an input unit 410, a display unit 420, a controller 430, a communication processor 440, and a storage unit 450. Information input through the input unit 410 is provided to the controller 430. Further, the display unit 420 displays various information relating to the user terminal 130 on a screen.

The application installed in the user terminal 130 of FIG. 2 may be included in the controller 430. The controller 430 may include a push message receiver 431, a terminal setting change unit 432, and a terminal information registration unit 433.

The push message receiver 431 receives, through the communication processor 440, a push message directly transmitted from the vehicle communication device 110 or through the push message server 120 and identifies information included in the received push message. The terminal setting change unit 432 changes a setting of the user terminal 130 as a function of information identified through the push message receiver 431. According to an embodiment of the present invention, when the terminal setting information is included in the push message, the terminal setting information 451 stored in the storage unit 450 is changed according to the corresponding terminal setting information.

Further, according to another embodiment of the present invention, when the mode information is included in the push message, at least one terminal setting information corresponding to the mode information is identified and the terminal setting information 451 stored in the storage unit 450 is changed according to the at least one identified terminal setting information. The storage unit 450 may further store mapping information related to at least one terminal setting information corresponding to each mode information.

The terminal information registration unit 433 registers terminal identification information of the user terminal 130 with the push message server 120. Accordingly, the message transmitted from the vehicle communication device 110 may be provided to the user terminal 130 though the push message server 120 in the form of the push message.

Components of each of the vehicle communication device 110 and the user terminal 130 are separately illustrated in the drawings to indicate that they may be functionally and logically separated from each other. However, this does not mean that they are physically separated or implemented by separated codes.

Further, in present invention, each function unit may refer to a functional or structural combination of hardware for realizing the technical idea of the present invention and software for driving the hardware. For example, each function unit may refer to a logical unit of a predetermined code or a hardware resource for executing the predetermine code, and it may be easily inferred by those skilled in the art that the function unit does not necessarily refer to a physically connected code or one type of hardware.

Hereinafter, user terminal setting changing methods according to embodiments of the present invention will be described in detail with reference to FIGS. 5A through 8B. First, a method according to an embodiment of the present invention will be described with reference to FIGS. 5A, 6A, 7A, and 8A, and a method according to another embodiment of the present invention will be described with reference to FIGS. 5B, 6B, 7B, and 8B.

Figure 5A:
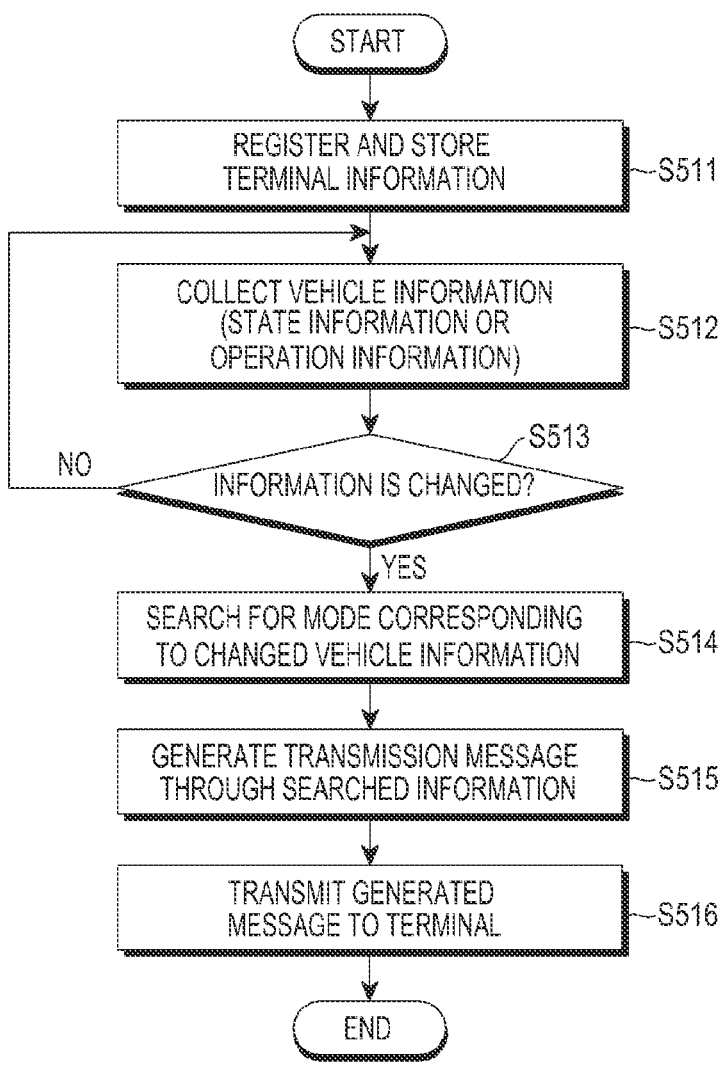
FIG. 5A is a flowchart illustrating a procedure for changing a user terminal setting according to an embodiment of the present invention.

FIG. 5A is a flowchart illustrating a procedure for changing a user terminal setting according to an of the present invention. Referring to FIG. 5A, in step S511, information on the user terminal (for example, terminal identification information) is registered in the vehicle communication device and stored in the storage unit. In step S512, current vehicle information (for example, vehicle state information or operation information) is collected.

In step S513, it is determined whether or not there is a change in the currently collected vehicle information. When there is a change in the currently collected vehicle information, mode information corresponding to the changed vehicle information is searched for in the storage unit in step S514. Otherwise, the method returns to step S512 and continues to collect vehicle information. However, regardless of whether or not there is a change in the vehicle information, the mode information may be searched for and a transmission message may be transmitted. In step S516, a transmission message is generated by the identified mode information. In step S516, the generated transmission message is transmitted to the user terminal through the push message server or directly transmitted to the user terminal.

Figure 6A:
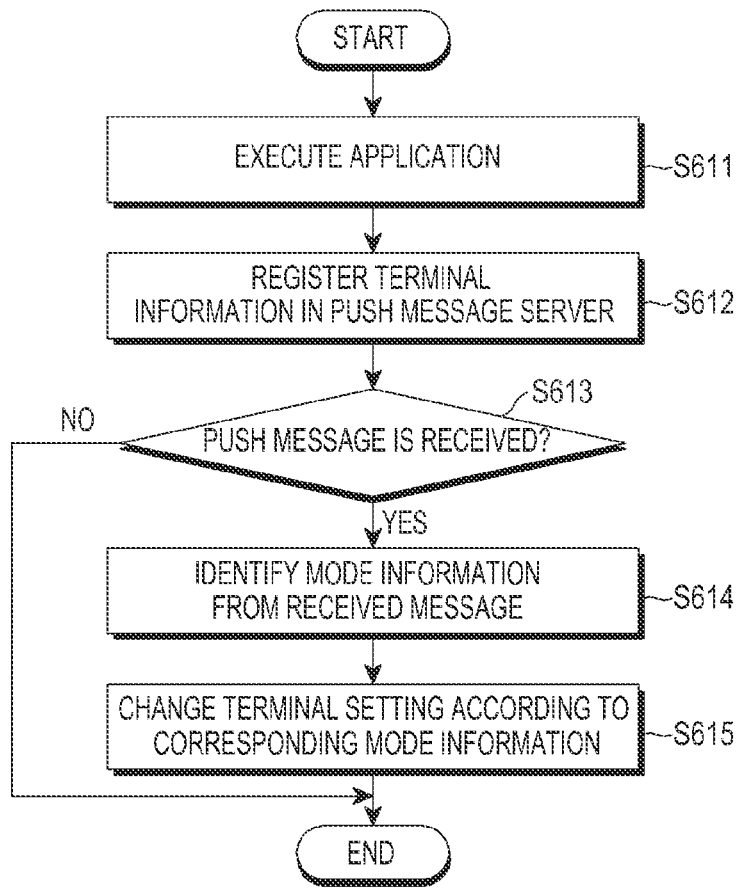
FIG. 6A is a flowchart illustrating a procedure of processing in a user terminal for changing a user terminal setting according to an embodiment of the present invention.

Referring to FIG. 6A, when the vehicle communication device transmits the push message as shown in step S516 of FIG. 5A, the user terminal changes a setting of the user terminal as a function of the transmitted push message. That is, when an application is first installed in the user terminal and then executed in step S611, information on the user terminal may be registered with the push message server in step S612.

When the push message transmitted through the procedure of FIG. 5A is received in step S613, mode information is identified from the received push message in step S614. In step S615, at least one terminal setting information corresponding to the mode information is identified and a corresponding setting of the user terminal is changed according to the identified terminal setting information.

FIG. 7A illustrates a structure of information stored in the vehicle communication device according to an embodiment of the present invention. Referring to FIG. 7A, message information 700a for configuring the transmission message may be stored in the storage unit of the vehicle communication device. As described above, terminal identification information 710 may be stored as the information on the user terminal, to which the transmission message will be transmitted. According to an embodiment of the present invention, at least one mode information 720 corresponding to current vehicle state information or operation information may also be stored. Examples of the at least one mode information 720 may include, for example, a driving mode 721, a silent mode 722, and a Bluetooth mode 723.

For example, the driving mode 721 is a mode mapped such that the vehicle is currently in a driving state, which may be determined by an ignition operation of the vehicle or by speed information of the vehicle. As described above, when the vehicle is in the driving mode 721, the setting may be changed such that a call reception mode of the user terminal is set as a bell mode, the call is automatically received when the call is incoming, and/or a received text is processed by TTS. Further, when a car audio device is turned on, the silent mode 722 may change the setting such that an output sound of the user terminal becomes silent. In addition, since the user cannot answer the call while driving in the Bluetooth mode 723, the user terminal may change the setting such that a Bluetooth headset or a Bluetooth earphone is automatically searched for and then connected.

FIG. 8A illustrates a structure of a message transmitted from the vehicle communication device according to an embodiment of the present invention. Referring to FIG. 8A, when the vehicle communication device receives current vehicle operation information or state information and identifies mode information of the received information, the vehicle communication device may configure a transmission message including the mode information and transmit the transmission message to the corresponding registered user terminal. The transmitted transmission message 800a may include data fields such as a header area 810, a terminal identification information area 820, and a mode information area 830a.

The header area 810 may include, for example, information indicating that the transmission message 800a is a message for changing the user setting, address information of the push message server as destination information of the transmission message 800a, composition information of the transmission message 800a, and length information of each data field.

The terminal identification information area 820 is a data field including identification information of the user terminal, and the push message server having received the transmission message 800a may identify the terminal identification information and transmit information included in the transmission message 800a to the corresponding user terminal in the form of the push message.

The mode information area 830a is a data field including, for example, mode information corresponding to current vehicle operation information or state information according to an embodiment of the present invention. As described above, the user terminal may identify the mode information and change various settings of the user terminal by at least one terminal information corresponding to the mode information. The composition of the transmission message 800a may further include other data fields as well as the components shown in FIG. 8A.

Hereinafter, the method according to another embodiment of the present invention will be described with reference to FIGS. 5B, 6B, 7B, and 8B.

Figure 5B:
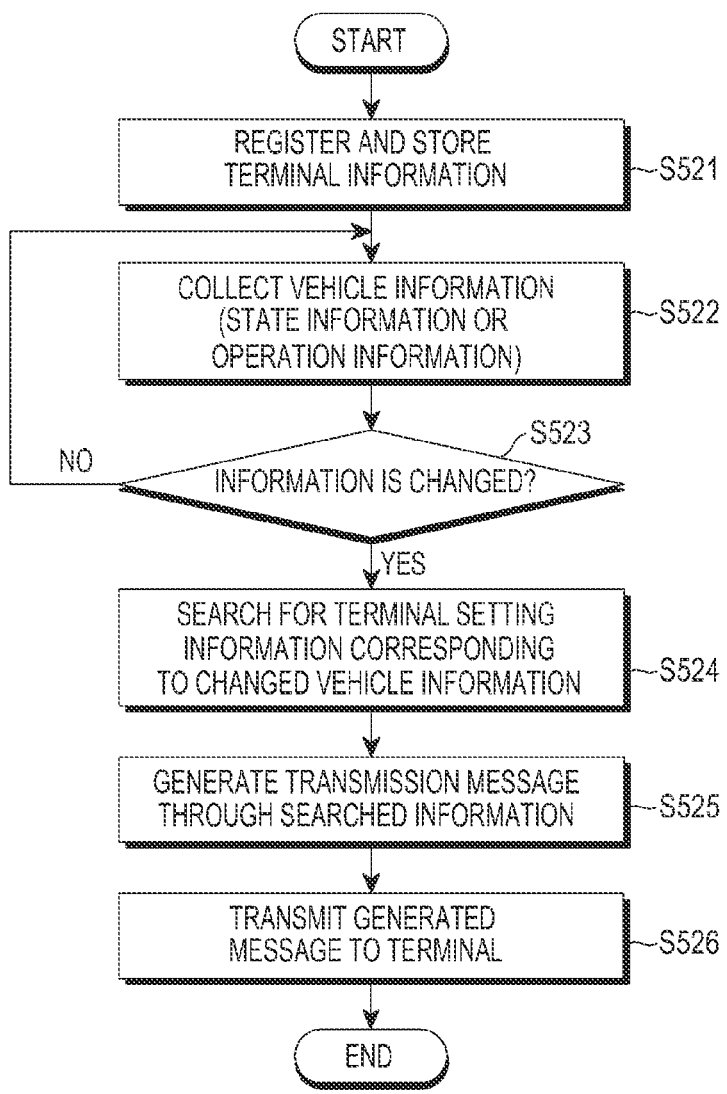
FIG. 5B is a flowchart illustrating a procedure for changing a user terminal setting according to an embodiment of the present invention.

FIG. 5B is a flowchart illustrating a procedure for changing the user terminal setting according to another embodiment of the present invention. Referring to FIG. 5B, in step S521, information on the user terminal (for example, terminal identification information) is first registered in the vehicle communication device and stored in the storage unit. In step S522, current vehicle information (for example, vehicle state information or operation information) is collected.

In step S523, it is determined whether or not there is a change in the currently collected vehicle information. When there is a change in the currently collected vehicle information, terminal setting information corresponding to the changed vehicle information is searched for in the storage unit in step S524. Otherwise, the method returns to step S522 and continues to collect vehicle information. However, regardless of the change in the vehicle information, the terminal setting information may be searched for and a transmission message may be transmitted. In step S525, a transmission message is generated by the identified terminal setting information. In step S526, the generated transmission message is transmitted to the user terminal through the push message server or directly transmitted to the user terminal.

Figure 6B:
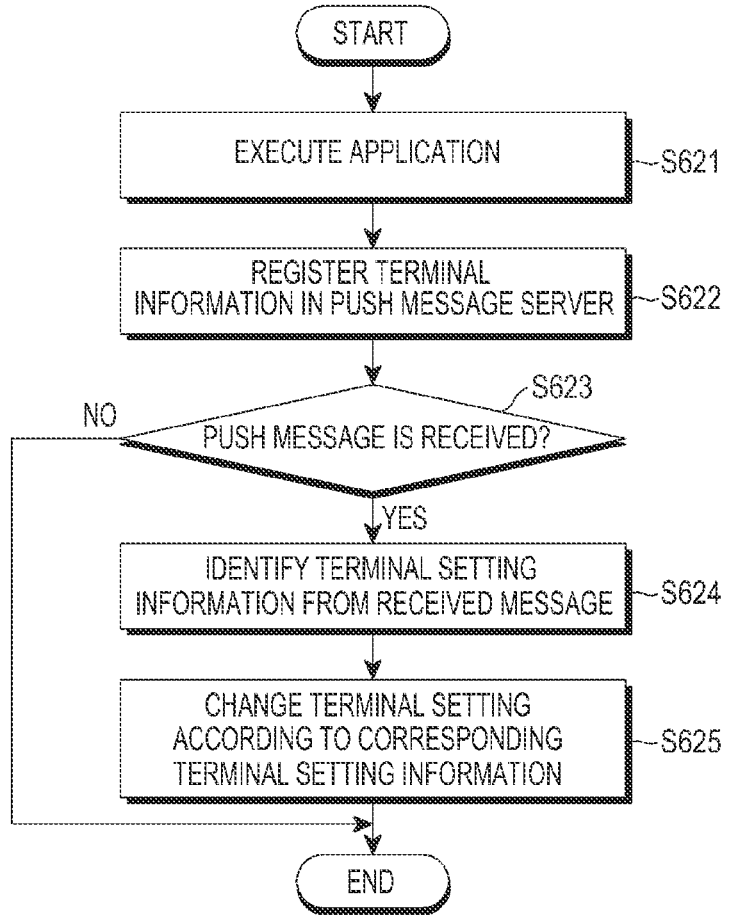
FIG. 6B is a flowchart illustrating a procedure for changing a user terminal setting according to an embodiment of the present invention.

Referring to FIG. 6B, when the vehicle communication device transmits the push message as shown in step S526 of FIG. 5B, the user terminal changes the setting of the user terminal as a function of the transmitted push message. That is, when an application is first installed in the user terminal and then executed in step S621, information on the user terminal may be registered in the push message server in step S622.

When the push message transmitted through the procedure of FIG. 5B is received in step S623, terminal setting information is identified from the received push message in step S624. In step S625, the corresponding setting of the user terminal is changed according to the identified terminal setting information.

FIG. 7B illustrates a structure of information stored in the vehicle communication device according to an embodiment of the present invention. Referring to FIG. 7B, message information 700b for configuring the transmission message may be stored in the storage unit of the vehicle communication device. As described above, the terminal identification information 710 may be stored as the information on the user terminal to which the transmission message will be transmitted. According to an embodiment of the present invention, at least one terminal setting information 730 corresponding to current vehicle state information or operation information also may be stored. Examples of the at least one terminal setting information 730 may include a vibration setting 731, a TTS setting 732, and a silent setting 733.

For example, with respect to the vibration setting 731, when the user desires to change the setting of the user terminal to the vibration setting in accordance with the current vehicle state or operation, the terminal setting information 730 of the vibration setting 731 is mapped to the corresponding vehicle state or operation and stored. Accordingly, when the corresponding vehicle state or operation is detected, terminal setting information of the vibration setting 731 mapped to the vehicle state or operation is inserted into the transmission message and the transmission message is then transmitted to the user terminal. As a result, the user terminal identifies the terminal setting information of the vibration setting 731 included in the push message and changes the setting of the user terminal to the vibration setting.

With respect to the TTS setting 732, when the user desires to change the setting of the user terminal to the TTS setting in accordance with the current vehicle state or operation, the terminal setting information 730 of the TTS setting 732 is mapped to the corresponding vehicle state or operation and stored. Accordingly, when the corresponding vehicle state or operation is detected, terminal setting information of the TTS setting 732 mapped to the vehicle state or operation is inserted into the transmission message and the transmission message is then transmitted to the user terminal. As a result, the user terminal identifies the terminal setting information of the TTS setting 732 included in the push message and changes the setting of the user terminal to the TTS mode. As described above, when the setting is changed to the TTS setting and the user terminal receives a text message, the user terminal outputs the text message, which is in a text form, as voice so that the user can listen to the message and understand the message while driving.

With respect to the silent setting 733, when the user desires to change the setting of the user terminal to the silent mode in accordance with the current vehicle state or operation, the terminal setting information 730 of the silent setting 733 is mapped to the corresponding vehicle state or operation and stored. Accordingly, when the corresponding vehicle state or operation is detected, terminal setting information of the silent setting 733 mapped to the vehicle state or operation is inserted into the transmission message and the transmission message is then transmitted to the user terminal. As a result, the user terminal identifies the terminal setting information of the silent setting 733 included in the push message and changes the setting of the user terminal to the silent mode.

FIG. 8B illustrates a structure of a message transmitted in the vehicle communication device according to an embodiment of the present invention. Referring to FIG. 8B, when the vehicle communication device receives current vehicle operation information or state information and identifies terminal setting information corresponding to the current vehicle operation information or state information, a transmission message including the terminal setting information is configured and then transmitted to the corresponding registered user terminal. The transmitted transmission message 800b may include data fields such as, for example, a header area 810, a terminal identification information area 820, and a terminal setting information area 830b.

The header area 810 may include, for example, information indicating that the transmission message 800b is a message for changing the user setting and address information of the push message server as destination information of the transmission message 800b, composition information of the transmission message 800b, and length information of each data field.

The terminal identification information area 820 is a data field including, for example, identification information of the user terminal, and the push message server having received the transmission message 800b may identify the terminal identification information and transmit information included in the transmission message 800b to the corresponding user terminal in a form of the push message.

The terminal setting information area 830b is a data field including, for example, terminal setting information corresponding to current vehicle operation information or state information according to an embodiment of the present invention. As described above, the user terminal may identify the terminal setting information and change various settings of the user terminal as a function of the terminal setting information. The composition of the transmission message 800b may further include other data fields as well as the components shown in FIG. 8B.

According to the embodiments of the present invention, the driver does not have to manually change the setting of the user terminal whenever the driver gets in the vehicle to drive the vehicle, thereby maximizing the driver's convenience.

Further, according to the embodiments of the present invention, the setting is made such that the user terminal searches for peripheral devices only when there are peripheral devices nearby, thereby preventing a battery from being unnecessarily drained in searching for the peripheral devices.

In addition, according to the embodiments of the present invention, the push message is transmitted to the user terminal when the user terminal enters a particular space (for example, a vehicle, theater or the like) and the setting of the user terminal is changed through the transmitted push message, so that the user can perform a desired operation and return the setting of the user terminal to the original state when the user terminal leaves the corresponding space, thereby maximizing the user's convenience.

Methods according to an embodiment of the present invention may be implemented in a form of a program command which can be executed through various computer means and be stored in a non-transitory computer-readable medium. The computer-readable medium may include a program command, a data file, a data structure, or a combination thereof. The program command recorded in the medium may be specially designed or configured for the present invention or known to and used by those skilled in a computer software field. Examples of the computer-readable medium include hardware devices specially configured to store and execute a program command, such as magnetic media such as a hard disk, a floppy disk, and a magnetic tape, optical media such as a Compact Disc Read Only Memory (CD-ROM), magneto-optical media such as a floptical disk, a ROM, a Random Access Memory (RAM), a flash memory and the like. Examples of the program command include a high level language code executable by a computer using an interpreter or the like as well as a machine language code made by a compiler. The hardware device may be implemented as one or more software modules in order to perform the operations of the present invention and vice versa.

It may be appreciated that the embodiments of the present invention can be implemented in software, hardware, or a combination thereof. Any such software may be stored, for example, in a volatile or non-volatile storage device such as a ROM, a memory such as a RAM, a memory chip, a memory device, or a memory Integrated Circuit (IC), or a recordable optical or magnetic medium such as a CD, a DVD, a magnetic disk, or a magnetic tape, regardless of its ability to be erased or re-recorded. It can be also appreciated that the memory included in the mobile terminal is one example of machine-readable devices suitable for storing a program including instructions that are executed by a processor device to thereby implement embodiments of the present invention. Therefore, embodiments of the present invention provide a program including codes for implementing a system or method claimed in any claim of the accompanying claims and a machine-readable device for storing such a program. Further, this program may be electronically conveyed through any medium such as a communication signal transferred via a wired or wireless connection, and embodiments of the present invention appropriately include equivalents thereto.

While the present invention has been shown and described with reference to certain embodiments thereof, it will be understood by those skilled in the art that various changes in form and details may be made therein without departing from the spirit and scope of the present invention as defined by the appended claims.

What is claimed is:

1. A vehicle communication device, comprising:
   a storage unit configured to store vehicle state information and operation information for mapping at least one vehicle mode information to terminal setting information of a user terminal and store identification information of the user terminal, wherein the at least one vehicle mode information is changed according to at least one of the vehicle state information and the operation information;
   a vehicle information collector configured to:
      collect vehicle information,
      determine if there is a change in the collected vehicle information, and
      when there is a change in the collected vehicle information, search for at least one vehicle mode information corresponding to the collected vehicle information, wherein the at least one vehicle mode information corresponding to the collected vehicle information is changed according to the terminal setting information mapped to the at least one vehicle mode information;
   a message generator configured to generate a transmission message including the at least one vehicle mode information corresponding to the collected vehicle information; and
   a message transmitter configured to transmit the generated transmission message to the user terminal through a push message by a push message server, if determining that the user terminal is located in a vehicle including the vehicle communication device.

2. The vehicle communication device of claim 1, wherein the at least one vehicle mode information includes a driving mode information which is set when a vehicle is started and in a running state.

3. The vehicle communication device of claim 1, wherein the vehicle state information includes power on/off information of a car audio device installed in a vehicle.

4. The vehicle communication device of claim 1, wherein the at least one vehicle mode information includes a silent mode information which is set when a car audio device of a vehicle is turned on.

5. The vehicle communication device of claim 1, wherein the terminal setting information includes one or more setting information including a bell setting, a vibration setting, a silent setting, a Text to Speech (TTS) setting, an automatic reception setting, and a Bluetooth device search setting.

6. The vehicle communication device of claim 1, wherein the at least one vehicle mode information includes a Bluetooth mode information which is related to a setting in which the user terminal attempts a connection with a Bluetooth headset or a Bluetooth earphone within a vehicle.

7. A system for changing a user terminal setting by using a push message, the system comprising:
   a vehicle communication device configured to:
      store vehicle state information or operation information for mapping at least one vehicle mode information to terminal setting information of the user terminal, wherein the at least one vehicle mode information is changed according to at least one of the vehicle state information and the operation information,
      collect vehicle information,
      determine if there is a change in the collected vehicle information, and
      when there is a change in the collected vehicle information, search for at least one vehicle mode information corresponding to the collected vehicle information, wherein the at least one vehicle mode information corresponding to the collected vehicle information is changed according to the terminal setting information mapped to the at least one vehicle mode information,
      transmit a generated transmission message including the at least one vehicle mode information corresponding to the collected vehicle information, if determining that the user terminal is located in a vehicle including the vehicle communication device, and
      store identification information of the user terminal;
   a push message server configured to receive the transmission message from the vehicle communication device, generate a push message through vehicle mode information included in the transmission message, and transmit the generated push message to the user terminal corresponding to the stored terminal identification information; and
   the user terminal configured to receive the push message from the push message server and change a setting according to the terminal setting information mapped to the vehicle mode information included in the push message.

8. A method of a vehicle communication device for changing a user terminal setting by using a push message, the method comprising:
   storing vehicle state information or operation information for mapping at least one vehicle mode information to terminal setting information of the user terminal, wherein the at least one vehicle mode information is changed according to at least one of the vehicle state information and the operation information;
   storing identification information of the user terminal;
   collecting vehicle information corresponding to a change in a vehicle state or operation;
   searching for at least one vehicle mode information corresponding to the collected vehicle information, wherein the at least one vehicle mode information corresponding to the collected vehicle information is changed according to the terminal setting information mapped to the at least one vehicle mode information;

generating a transmission message, including the at least one vehicle mode information corresponding to the collected vehicle information; and transmitting the generated transmission message to the user terminal through a push message by a push message server, if determining that the user terminal is located in a vehicle including the vehicle communication device.

9. The method of claim 8, wherein the at least one vehicle mode information includes a driving mode information which is set when a vehicle is started and in a running state.

10. The method of claim 8, wherein the vehicle state information includes power on/off information of a car audio device installed in a vehicle.

11. The method of claim 8, wherein the at least one vehicle mode information includes a silent mode information which is set when a car audio device of a vehicle is turned on.

12. The method of claim 8, wherein the terminal setting information includes one or more setting information including a bell setting, a vibration setting, a silent setting, a Text to Speech (TTS) setting, an automatic reception setting, and a Bluetooth device search setting.

13. The method of claim 8, wherein the at least one vehicle mode information includes a Bluetooth mode information which is related to a setting in which the user terminal attempts a connection with a Bluetooth headset or a Bluetooth earphone within a vehicle.

14. A non-transitory computer-readable recording medium recording a program command for executing at least one operation in a vehicle communication device, wherein the at least one operation comprises:

storing vehicle state information or operation information for mapping at least one vehicle mode information to terminal setting information of the user terminal, wherein the at least one vehicle mode information is changed according to at least one of the vehicle state information and the operation information;

storing identification information of the user terminal;

collecting vehicle information corresponding to a change in a vehicle state or operation;

search for at least one vehicle mode information corresponding to the collected vehicle information, wherein the at least one vehicle mode information corresponding to the collected vehicle information is changed according to the terminal setting information mapped to the at least one vehicle mode information;

generating a transmission message, including the at least one vehicle mode information corresponding to the collected vehicle information; and transmitting the generated transmission message to the user terminal through a push message by a push message server, if determining that the user terminal is located in a vehicle including the vehicle communication device.

* * * * *